US006532815B2

(12) United States Patent
Wech

(10) Patent No.: US 6,532,815 B2
(45) Date of Patent: Mar. 18, 2003

(54) FLUID LEVEL VERIFICATION APPARATUS

(75) Inventor: Michael J. Wech, Two Rivers, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 56 days.

(21) Appl. No.: 09/885,863

(22) Filed: Jun. 20, 2001

(65) Prior Publication Data

US 2002/0014118 A1 Feb. 7, 2002

Related U.S. Application Data

(60) Provisional application No. 60/212,931, filed on Jun. 20, 2000.

(51) Int. Cl.[7] ............................................... G07F 23/02
(52) U.S. Cl. ............................................. 73/328; 73/323
(58) Field of Search .......................... 73/323, 328, 330, 73/325

(56) References Cited

U.S. PATENT DOCUMENTS

| 21,836 A | * | 10/1858 | Johnson et al. ................ 73/328 |
| 707,943 A | * | 8/1902 | Rockwell ....................... 73/328 |
| 986,199 A | | 3/1911 | Moser |
| 1,164,484 A | | 12/1915 | Ernst |
| 1,406,929 A | | 2/1922 | Butcher |
| 3,154,945 A | * | 11/1964 | Busillo ......................... 73/328 |
| 3,212,334 A | | 10/1965 | Conlon |
| 3,292,434 A | | 12/1966 | McDaniel |
| 3,455,163 A | | 7/1969 | Lukas et al. |
| 3,540,276 A | | 11/1970 | Lyden |
| 3,835,708 A | | 9/1974 | Gruett |
| 3,886,796 A | | 6/1975 | Gruett |
| 4,050,305 A | | 9/1977 | Evans et al. |
| 4,345,468 A | | 8/1982 | Jackson |
| 5,323,653 A | | 6/1994 | Gruett |

FOREIGN PATENT DOCUMENTS

| GB | 1133798 | 11/1968 |
| WO | WO 84/04163 | * 10/1984 |

* cited by examiner

*Primary Examiner*—Daniel S. Larkin
*Assistant Examiner*—Michael Cygan
(74) *Attorney, Agent, or Firm*—Ryan Kromholz & Manion, S.C.

(57) ABSTRACT

An improved fluid level verification apparatus which may be manufactured or otherwise fabricated as a kit and assembled at a remote location for use on liquid filled containers and configured to reduce inherent mechanical stresses on the inspection tube and resists leakage due to environmental, chemical, thermal or mechanical expansion cycles by using internal grooves and entrapped o-rings.

7 Claims, 6 Drawing Sheets

FLUID LEVEL VERIFICATION APPARATUS

RELATED APPLICATION

This application claims the benefit of Provisional Application No. 60/212,931, Filed Jun. 20, 2000.

BACKGROUND OF THE INVENTION

1. Field of the Invention

The present invention relates generally to a fluid level verification apparatus which is operable to measure the amount of fluid present in an object of interest, such as a tank, machine, or other article of manufacture, and more specifically, to an apparatus which may be manufactured or otherwise fabricated as a kit and assembled at a remote location for use on particular machines or in manufacturing processes; and which minimizes the number of components required; and further to a fluid level verification apparatus which reduces mechanical, thermal and chemical stresses on the apparatus.

2. Description of the Prior Art

The prior art is sated with examples of fluid level verification apparatuses which provide a means for visually verifying or otherwise discovering the fluid levels in an object of interest, such as manufacturing machinery, fluid holding tanks, or other similar assemblies. For example, in certain industrial processes or in certain machines or other articles of manufacture, it is important that particular fluids, such as lubricants, coolants, hydraulic fluids, or other fluid components, be stored in tanks and periodically dispensed from such tanks. Prior art fluid verification devices have typically included a transparent tube or inspection window, which is connected in particular relation to the holding tank, and which provides a quick and convenient means by which an observer may visually verify the level of the fluid present.

While the prior art devices have operated with success, they have been unsatisfactory in several respects.

Gruett U.S. Pat. No. 5,323,653 provides a detailed background of the prior art and describes a fluid level verification apparatus that can be fabricated as a kit and assembled at a remote location. Gruett contemplates an inspection tube having an interior conduit dimensioned to create an interference fit with an o-ring used to hermetically seal the inspection tube to an end member. The Gruett apparatus requires a separate seal on the outer diameter of its glass inspection tube to complete a hermetic seal.

Jackson U.S. Pat. No. 4,345,468 describes a double tube liquid site monitor which incorporates grooving and o-rings to isolate the inspection tube from the environment. However, the Jackson invention is complex and cumbersome, as it requires numerous parts to protect the inspection tube from the stresses caused by the environment. Moreover, the sealing function of the grooves are limited to the insert ends thus requiring the o-rings to rest against the internal and external surfaces of inspection tubes that have no such grooves and the problem of mechanical stress induced by the assembly of the inspection tubes to mating components is not contemplated.

Evans U.S. Pat. No. 4,050,305 describes an external shield bracket for a fluid flowmeter. The fluid of interest flows through a precision glass tube. An operator is protected from accidental explosion of the inspection tube due to fluid pressure by a protective transparent cover mounted on a u-shaped channel bracket. The Evans invention uses many parts, but fails to protect the inspection tube from the environment. Said transparent cover and mounting bracket do not form a hermetic closure for the inspection tube contained therein.

Gruett U.S. Pat. No. 3,886,796 describes a liquid level gauge with a rigid transparent plastic inspection tube with o-rings seated in grooves located in the end members. The Gruett invention induces mechanical stress on the inspection tube because Gruett did not contemplate o-ring grooves on the exterior or interior portions of the inspection tube. Further, because the ends of the inspection tube are restricted and nested in end members, stresses related to thermal, environmental and chemical expansion cycles are exasperated.

Lyden U.S. Pat. No. 3,540,276 describes a fluid level gauge. The Lyden invention uses an o-ring seal nested in an end member, communicating with the adjacent end of a site tube. Fluid leaks are minimized by placing the glass site tube in compression with the o-ring seal nested in the respective end member. The glass site tube is required because the Lyden invention requires compressive force on the tube. Thus, the design creates inherent mechanical stress and without utilizing the glass site tube adopts poorly to thermal, environmental and chemical expansion cycles and therefore would be susceptible to leakage.

In addition to the foregoing, many of the prior art devices are cumbersome and otherwise complex in their overall design, thereby increasing the cost to manufacture, decreasing the reliability and making them difficult to maintain. Further, the prior art is replete with designs that inadequately address the often conflicting requirements of resisting fluid leaks and protecting the inspection tube from mechanical, environmental, thermal and chemical stresses.

SUMMARY OF THE INVENTION

Therefore, it is an object of the present invention to provide an improved fluid level verification apparatus.

Another object of the present invention is to provide a fluid level verification apparatus which can be fabricated as a kit and remain assembled through subsequent handling, transport, and shipping operations.

Another object of the present invention is to provide a fluid level verification apparatus which can be manufactured to provide convenient means to efficiently assemble the apparatus at a remote location for use with a wide range of devices and other objects of interest without waste of effort, time or motion expended on reassembly of the apparatus. Specifically, an object of the present invention is to prevent inadvertent dislodging of particular components comprising the invention, such as the bolts in relation to the blocks.

Another object of the present invention is to protect the transparent inspection tube from mechanical stress during manufacture, transport, handling, shipping, assembly, and use to a wide range of devices and other objects of interest.

Another object of the present invention is to provide a means to reduce or eliminate stress on the apparatus, whether such stress is due to thermal, mechanical, environmental or chemical agents acting upon the apparatus.

Another object of the present invention is to provide a means to reduce or eliminate leaking of the fluid flowing through the apparatus.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
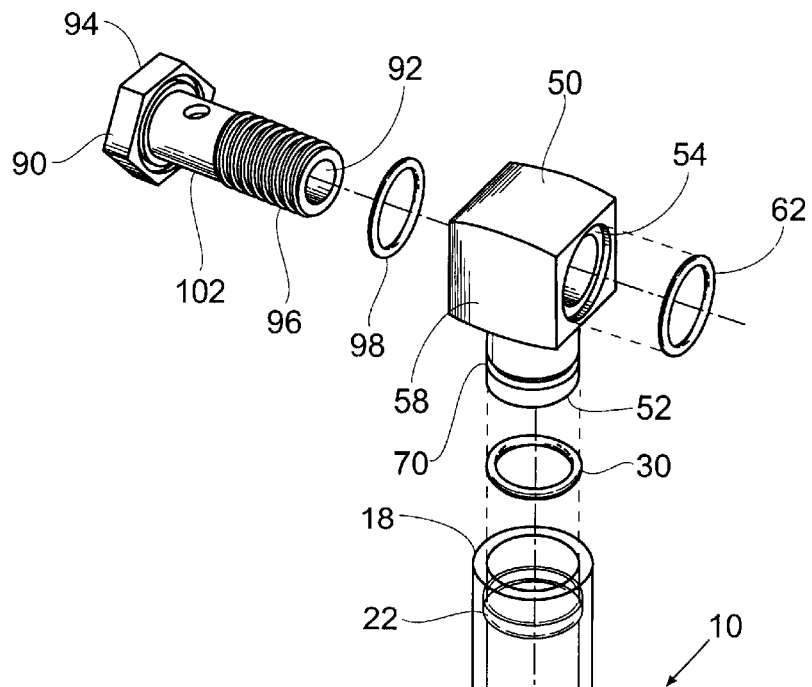
FIG. 1 is an exploded isometric view of the present invention.
Figure 1:
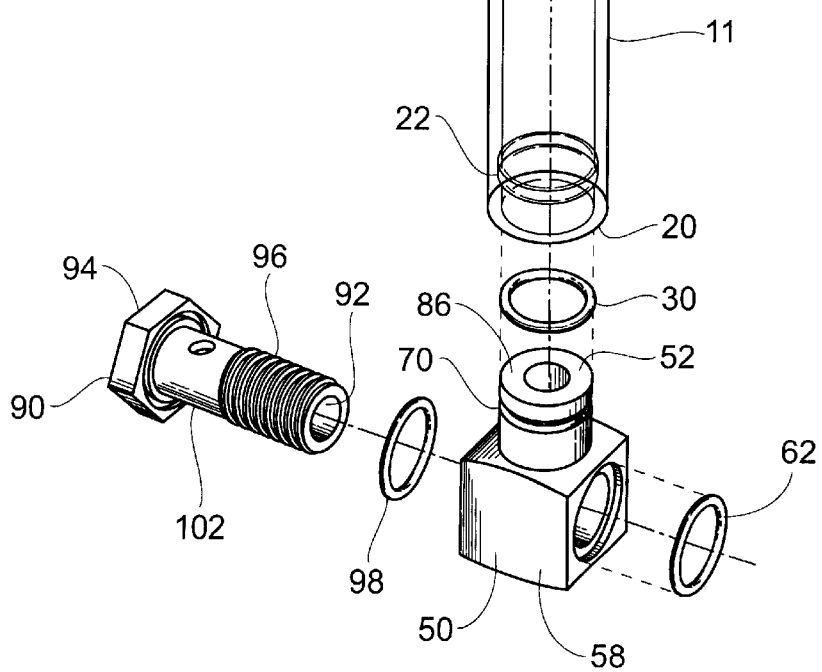

Referring to FIG. 1, an improved fluid level verification apparatus 10 of the present invention is shown. The apparatus 10 has a clear inspection tube 11 having a first end 18 and a second end 20. Also depicted is a pair of end members or supporting blocks 50, each block 50 having six sides and a pair of mounting bolts 90. Each block 50 is removably secured to the inspection tube 11 at the first end 18 and second end 20, respectively. In turn, each bolt 90 is seated in a respective block 50.

Figure 2:
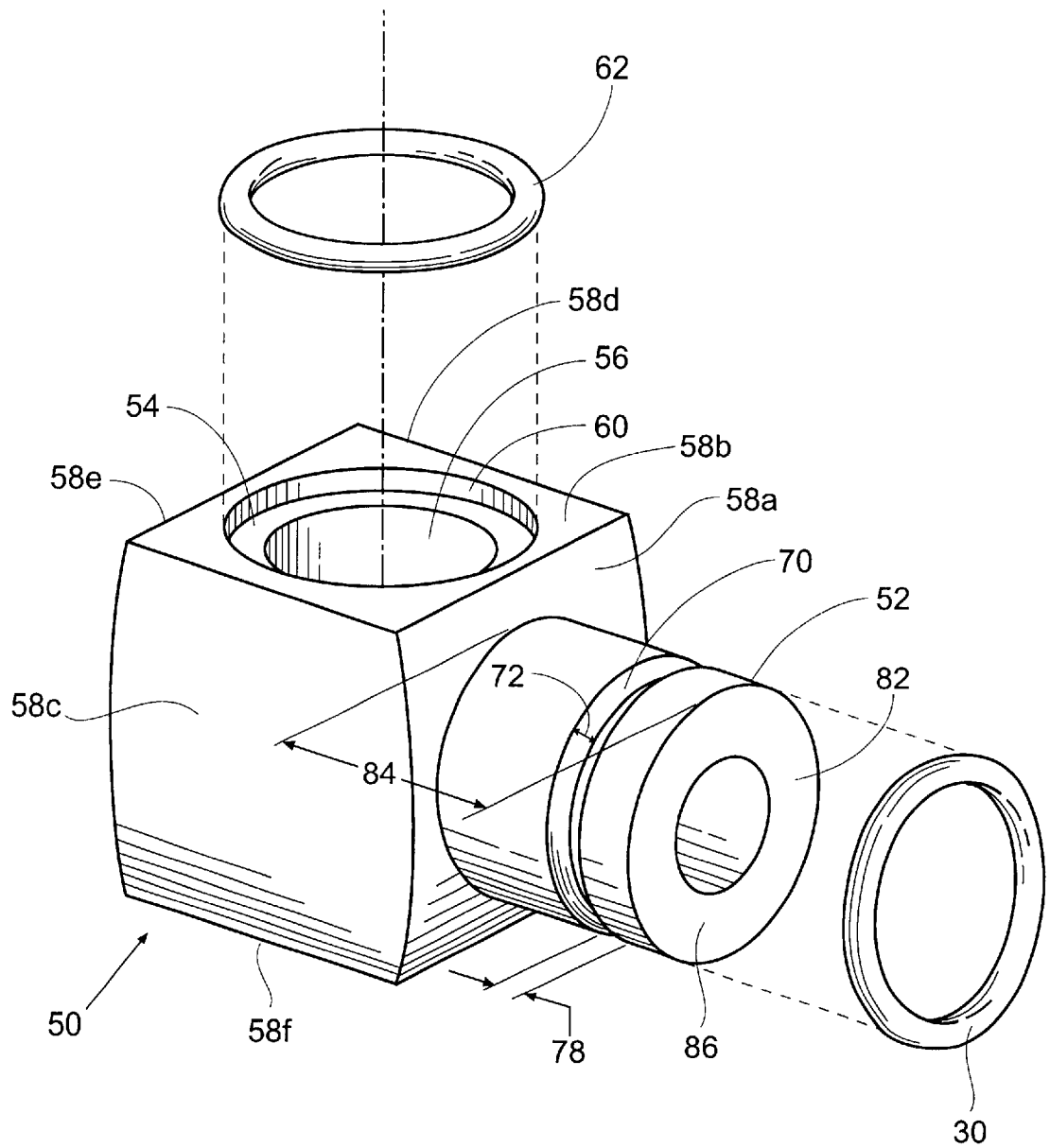
FIG. 2 detailed, exploded isometric view of a supporting block of the present invention.

Referring specifically to FIG. 2, each block 50, preferably comprises a plurality of faces 58a 58b 58c 58d 58e 58f, has a cylindrical projection or nipple 52 protruding at a generally perpendicular offset from a face 58a of the block 50. The nipple 52 has an aperture 82, which extends through the nipple 52 from the tip 86 to intersect a bore 56 of the block 50, and is oriented generally parallel with the axis of the nipple 52. The nipple 52 is of a predetermined nipple height 84. The nipple 52 has a concentric channel 70 with a predetermined channel depth 72 and channel height 78.

Still referring to FIGS. 1 and 2, a tube seal 30 is depicted. The tube seal 30 fits on the nipple 52 and is seated in the channel 70. In a preferred embodiment, the tube seal 30, as well as other seals hereinafter described, may comprise an o-ring made from deformable synthetic material, such as nitrile, fluorocarbon, EPDM, and other similar materials.

Figure 5:
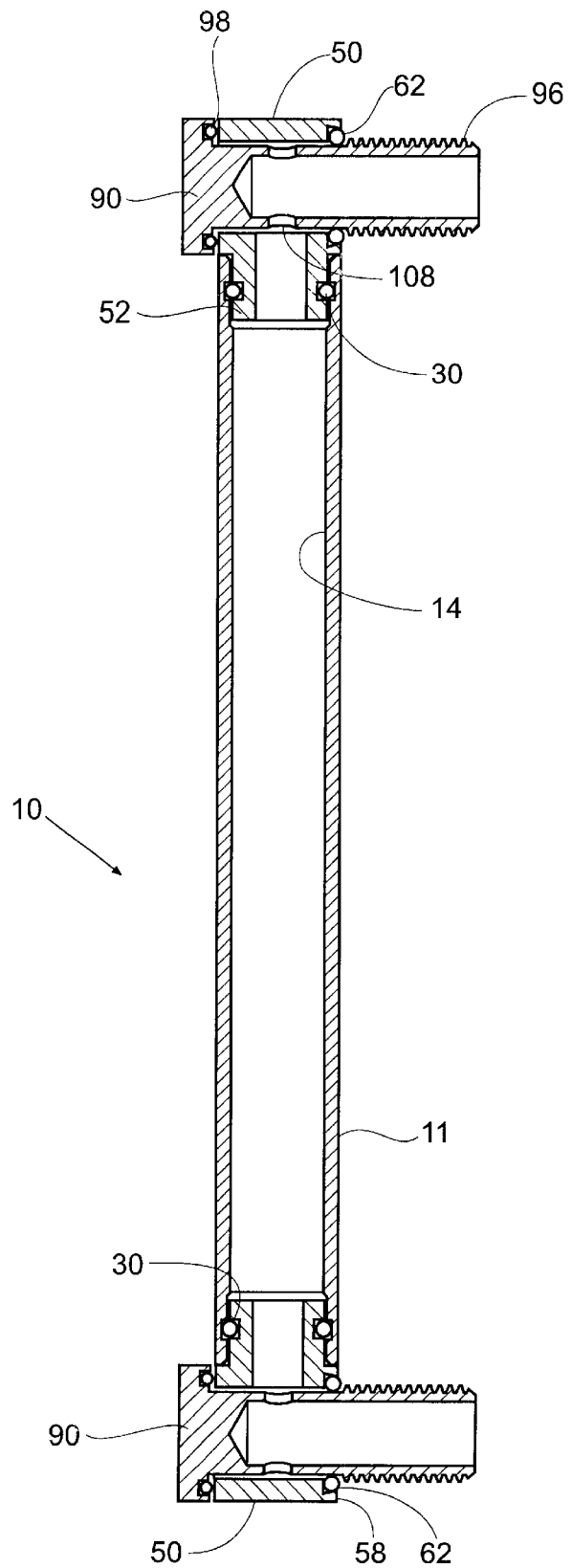
FIG. 5 is a cross-sectional view of the present invention.
Figure 6:
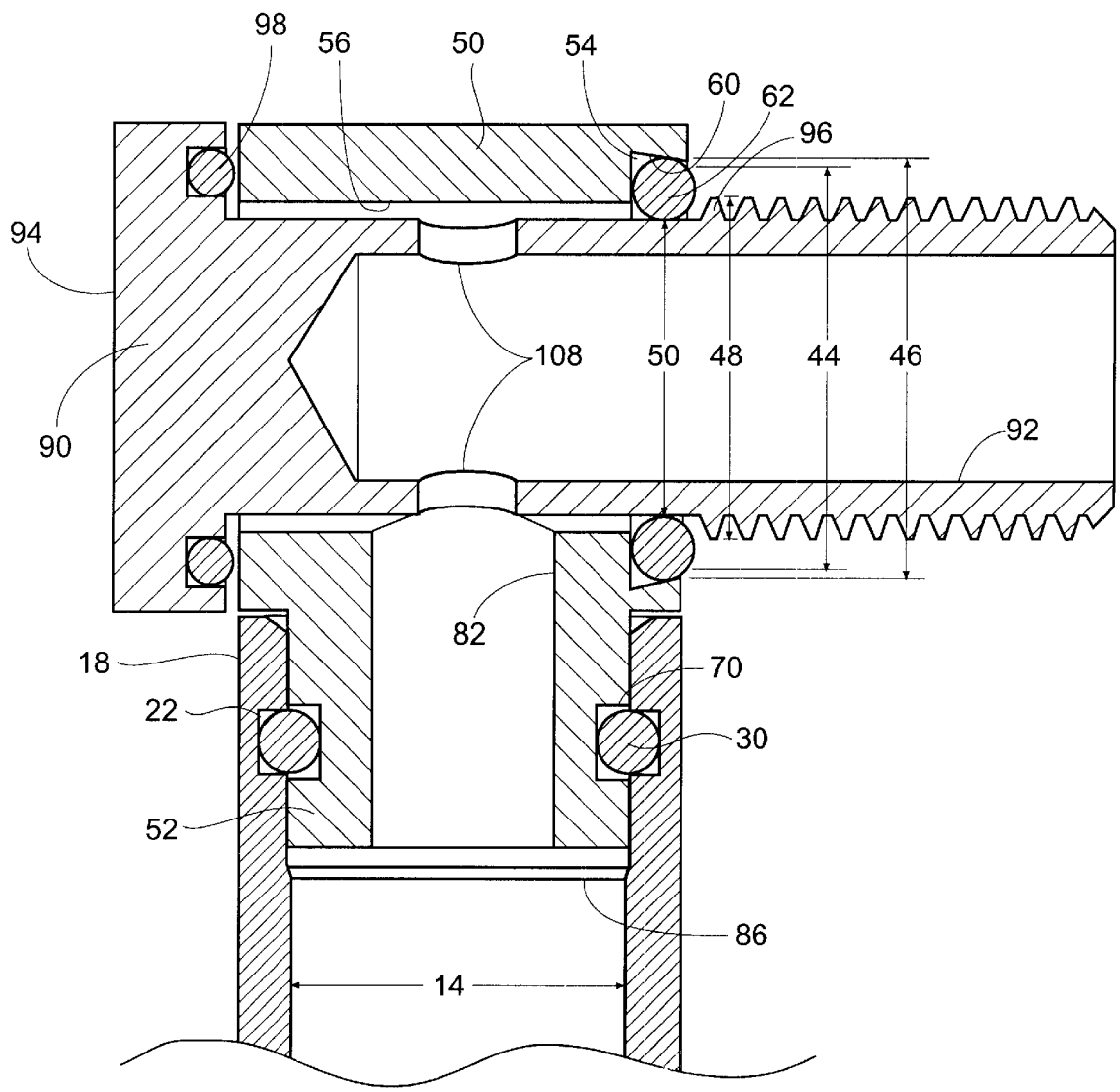
FIG. 6 is an enlarged fragmentary, cross-sectional view of a cooperating block, bolt and inspection tube of the present invention.

Referring now to FIGS. 1, 2, 5 and 6, the face 58b of block 50 has a depressed annular groove 54, which locates a concentrically located recessed inwardly tapered bevel 60 and communicating with the coaxial bore 56. As previously stated, the annular groove 54, the bevel 60, and the bore 56 are located on a face 58b that is adjacent and generally perpendicular to the nipple 52. The bore 56 projects through the entire block 50 and intersects the aperture 82 of the nipple 52. A seal 62 sits on the block 50 at the depressed annular groove 54, creating a hermetic closure between the seal 62, the recessed bevel 60, the bore 56 and a bolt 90. Again, in the preferred embodiment, the seal 62 may comprise an o-ring or similar structure formed from a deformable material. When assembled, as shown in FIGS. 5 and 6, the bolt 90 is placed through the block 50 and the seal 62 creates an interference fit with a bolt thread 96 and a shaft 102.

Figure 3:
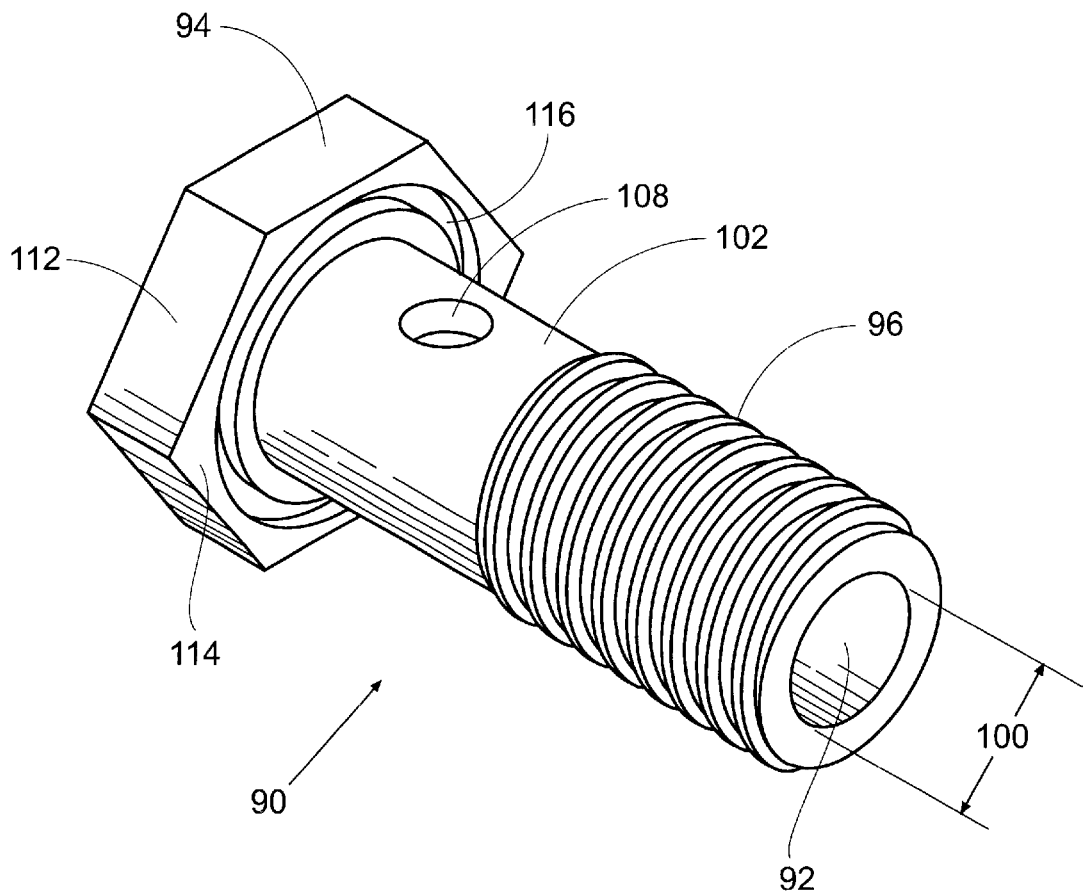
FIG. 3 detailed isometric view of a bolt used in the present invention.

With reference to FIG. 3 in particular, the bolt 90 comprises a head 94, a hollow shaft 102, a thread 96 and a cylinder 92 with an inner diameter 100. Interposed on the bolt shaft 102 at a right angle is an intersecting bolt hole 108. The shaft 102 terminates in a bolt head 94. The bolt head 94 has a bolt face 112 and an underside 114. The underside 114 has an annular groove 116 arranged to receive a gasket 98. The diameter of each of the bores 56 of the respective blocks 50 is larger than the inner unthreaded portion of the bolts 90 to provide sufficient spacing for free flow of fluid through the hollow bore 92 of the bolt 90, the bolt holes 108, the aperture 82 of the nipple 52 and the conduit 14.

Figure 4:
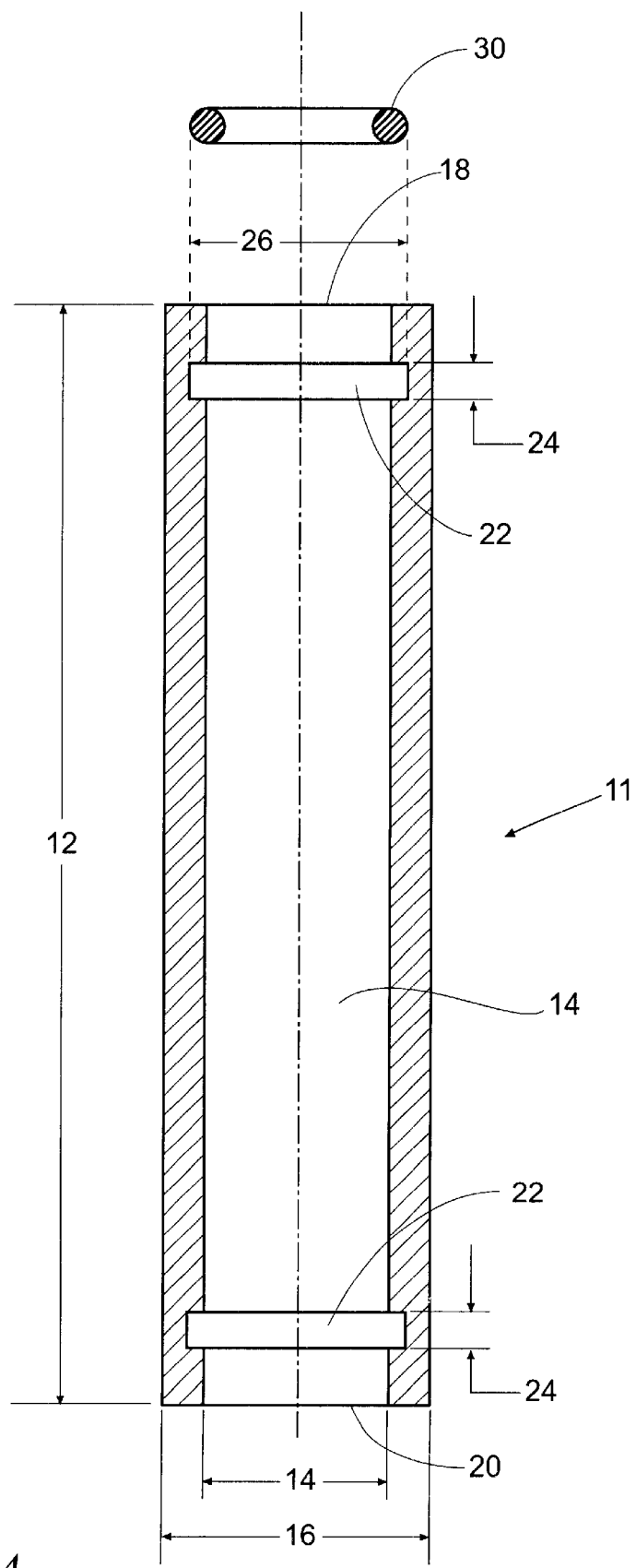
FIG. 4 is a vertical cross sectional view of the inspection tube of the present invention.

Now referring to FIG. 4, a vertical cross section of the inspection tube 11 is shown in detail. The tube 11 comprises the first end 18, the second end 20, a tube length 12, a conduit 14, and an outer diameter 16. Positioned at a predetermined distance from the respective tube ends 18, 20 grooves 22 are oppositely disposed, each having a respective groove height 24 and groove depth 26. The respective groove depths 26 are selected to accommodate sealing gaskets 30.

The tube 11 may be manufactured from various substrates such as nylon, polycarbonate, or other synthetic materials. While shown to be cylindrical in shape, it is conceivable that other conduit cross-sectional configurations could be utilized.

The inspection tube 11 is removably secured to the nipple 52 by means of the tube seal 30 that fits on the nipple 52 at the channel 70. The tube seal 30 simultaneously lodges in the groove 22 of the inspection tube 11.

Referring now to FIG. 5, the apparatus 10 is connected in fluid flowing relation to an object of interest, such as a tank (not shown). So connected, the compression exerted on the respective bolts 90 compresses a sealing gasket 98 against the face 58f of the block 50, thus facilitating a hermetic closure. Similarly, the seal 62 resting on the bolt 90 at the junction of the thread 96 and shaft 102, is compressed at the annular groove 54 creating a hermetic closure of the seal 62, the recessed bevel 60, annular groove 54 and bore 56 of the bolt 90. Seal 62 also seals against the tank surface (not shown) to prevent leakage around thread 96 when the apparatus 10 is mounted to the tank.

Fluid dispensed from and returning to the object of interest, such as a tank 5 (not shown but including an entrance threaded opening matching the threads 96 of the bolts 90), thereby flowing through the bolt 90 by means of the cylinder bore 92, and the block 50 by means of the bore 56 in the block 50, and cooperating with the bolt hole 108. Fluid enters the aperture 82 of the nipple 52, and fills the conduit 14 of the inspection tube 11 to the liquid level of the tank supporting the inspection tube 11.

Referring generally to FIG. 4 and of particular importance, the inspection tube 11 has grooves 22 positioned near the first end 18 and second end 20, respectively. As previously mentioned, each undercut groove 22 of the tube 11 is dimensioned so that the tube seal 30 lodges in the respective groove 22, creating a hermetic closure when the seal 30 is simultaneously fit on the respective nipple 52 and assembled to the tube 11 to provide the apparatus 10 of the present invention. As opposed to the press fit relationship taught in the prior art, a slip fit exists between the inspection tube 11, seal 30 and nipple 52. The seal 30 operates not only to seal the block 50 to the tube 11, but also to hold each block in place. Based upon of the slip fit relationship between the groove 22, the o-ring 30 and the channel 70 of the nipple 52, a hermetic closure is formed with minimal or no mechanical stresses resulting on the inspection tube 11. By greatly decreasing the radial stresses imparted upon the inspection tube 11, the expected life of the tube 11 is thereby increased.

A second important aspect of the invention relates to the formation of the inwardly tapered, recessed bevel 60 and its cooperating coaxial inward tapered bore 56. As shown in FIG. 6, the recessed bevel has an inner diameter 44 within the concentric bore 56 that is located adjacent the block face 58b. The inner diameter 44 is less than the recessed bevel outer diameter 46 located at the innermost portion of the concentric bore 56. The recessed bevel 60 retains the seal 62 and thus prevents displacement of the seal 62 during shipping. The same benefit is derived during installation of the fluid level verification apparatus 10. By positively retaining the seal 62 within block 50, the seal will not become fully or partially dislodged during installation.

Also, of particular importance is the above described interference fit between the seal 62 and an outwardly extending flange, which may be in the form of the innermost bolt thread 96. As best seen in FIG. 6, the major diameter 48 of the bolt threads is greater than the inner diameter 50 of the seal 62. Once assembled, the resulting interference fit prevents the bolt 90 from becoming dislodged from the block 50 as commonly occurs with prior art devices, particularly during shipping. This apparatus also provides a benefit during installation, as the installer is free to manipulate the apparatus 10 without the bolts 90 falling free from their associated blocks 50.

The above described embodiments of this invention are merely descriptive of its principles and are not to be limited. The scope of this invention instead shall be determined from the scope of the following claims, including their equivalents.

What is claimed is:

1. A fluid level verification apparatus comprising:
    a tubular sight member defining a conduit and having oppositely disposed ends;
    an undercut groove formed within the conduit inwardly spaced from each respective end;
    first and second end blocks each having a plurality of faces, said end blocks, respectively, include a bore extending between opposite faces; and
    a nipple, said nipple being formed on a face adjacent said bore;
    an opening being formed in said nipple and being in fluid communication with said bore;
    each of said nipples having a circumferential groove exteriorly thereof and being adapted to receive said tube ends;
    sealing means being positioned on each of said nipples in said groove and adapted to receive one of said respective conduit grooves to thereby provide a slip-fit between said nipples and said tube ends; and
    first and second hollow fastening means adapted to be received within said bores and being in fluid communication with said sight member.

2. The fluid level verification apparatus of claim 1 for attachment to a tank containing a fluid, wherein the first and second fastening means each comprise a headed bolt extending through said block bores; and sealing means around each bolt at the opposite sides of the end blocks to seal the blocks against the bolt and tank respectively.

3. The fluid level verification apparatus of claim 2 wherein a recessed bevel is formed on one face of each end block, said bevel being inwardly tapered to receive and retain said sealing means.

4. The fluid level verification apparatus of claim 2 wherein the threaded bolt has an outwardly extending flange having a predetermined diameter and being located intermediate to the ends of said bolt and the sealing means comprises an o-ring having an inner diameter less than the major diameter.

5. The fluid level verification apparatus of claim 4 wherein the outwardly extending flange consists of the innermost thread of said threaded bolt.

6. A fluid level verification apparatus for a tank containing a fluid, the apparatus comprising:
    a pair of vertically spaced hollow end members, the respective end members having a cylindrical projection extending therefrom in facing and axially aligned relation, said projections having an axial through bore communicating with the hollow interior of the corresponding end member and a circumferential groove exteriorly thereof;
    a rigid tubular sight member interposed between said end members and having a cylindrical bore adapted to receive the end member projections in opposed relation and a pair of longitudinally spaced, circumferential grooves formed within said bore;
    a seal disposed in the grooves of the respective end member projections and sealingly engaging with the grooves of the tubular member to seal the connection between the tubular member and the respective end members; and
    hollow fastening means for connecting at least one of said end members to the tank for mounting the apparatus and placing the fluid contents of the tank in communication with the sight member.

7. A fluid level verification apparatus for a tank containing a fluid, the apparatus comprising:
    a pair of vertically spaced end members each having hollow interiors, the respective end members each having a cylindrical projection extending therefrom in facing and axially aligned relation;
    each of said projections having an axial through bore communicating with the hollow interior of a corresponding end member and further including a circumferential groove exteriorly thereof;
    a tubular sight member interposed between said end members and having a cylindrical bore adapted to receive the end member projections in opposed relation and a pair of longitudinally spaced grooves formed within said bore, each groove being adjacent an end of said member;
    an o-ring seal disposed in the grooves of the respective end member projections and sealingly engaging with the tubular member bore grooves to seal the connections between the tubular member and the respective end members;
    hollow fastening means connecting at least one of said end members to the tank for mounting the apparatus and placing liquid contents of the tank in communication with the sight member;
    said hollow fastening means comprising a headed bolt extending in fore and aft direction through the hollow end member; and
    sealing means surrounding the bolt at the front and rear of the end member to seal the member against the bolt head and tank respectively.

\* \* \* \* \*